(12) United States Patent
Salehi et al.

(10) Patent No.: US 11,807,275 B2
(45) Date of Patent: Nov. 7, 2023

(54) METHOD AND PROCESS FOR DEGRADATION MITIGATION IN AUTOMATED DRIVING

(71) Applicant: GM Global Technology Operations LLC, Detroit, MI (US)

(72) Inventors: Rasoul Salehi, Ann Arbor, MI (US); Wen-Chiao Lin, Rochester Hills, MI (US); Sayyed Rouhollah Jafari Tafti, Troy, MI (US); Reza Zarringhalam, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 17/397,171

(22) Filed: Aug. 9, 2021

(65) Prior Publication Data

US 2023/0039636 A1   Feb. 9, 2023

(51) Int. Cl.
*B60W 60/00* (2020.01)
*B60W 30/095* (2012.01)

(52) U.S. Cl.
CPC .... *B60W 60/0018* (2020.02); *B60W 30/0953* (2013.01); *B60W 30/0956* (2013.01); *B60W 2554/4041* (2020.02); *B60W 2554/4049* (2020.02)

(58) Field of Classification Search
CPC ......... B60W 60/0018; B60W 30/0953; B60W 30/0956; B60W 2554/4041; B60W 2554/4049; B60W 60/0059
See application file for complete search history.

(56) References Cited

U.S. PATENT DOCUMENTS

| | | | |
|---|---|---|---|
| 10,459,436 B2 | 10/2019 | Samii et al. | |
| 10,503,170 B2 | 10/2019 | Du et al. | |
| 10,663,309 B2* | 5/2020 | Lin | G01C 21/3461 |
| 10,678,247 B2 | 6/2020 | Jiang et al. | |
| 2020/0039528 A1* | 2/2020 | Ewert | G01S 7/4021 |
| 2020/0133281 A1* | 4/2020 | Gomez Gutierrez | G05D 1/0214 |
| 2021/0406722 A1* | 12/2021 | Armstrong-Crews | G06N 3/045 |

\* cited by examiner

*Primary Examiner* — Abby Y Lin
*Assistant Examiner* — Dylan M Katz
(74) *Attorney, Agent, or Firm* — CANTOR COLBURN LLP

(57) ABSTRACT

A vehicle and a system method of operating the vehicle is disclosed. The system includes a monitoring module and a mitigation module operating on a processor. The monitoring module is configured to measure a degradation in an operation parameter of the vehicle, the vehicle operating in a first state based on a first value of a set of adaptive parameters. The mitigation module is configured to determine a threat to the vehicle due to operating the vehicle in the first state with the degradation in the operation parameter and adjust the set of adaptive parameters from the first value to a second value that mitigates the threat to the vehicle, wherein the processor operates the vehicle in a second state based on the second value.

17 Claims, 11 Drawing Sheets

METHOD AND PROCESS FOR DEGRADATION MITIGATION IN AUTOMATED DRIVING

INTRODUCTION

The subject disclosure relates to operation of an autonomous vehicle and, in particular, to a system and method for mitigating the effects of a fault or degradation in operation of the autonomous vehicle on the safety of the autonomous vehicle, where the degradation can be either in hardware or software.

An autonomous vehicle obtains data from its environment and navigates through its environment based on this data. Data from the environment is obtained using sensors or communication networks and motion of the vehicle is controlled using an actuation system (i.e., propulsion, steering, brakes, etc.). The safe operation of the vehicle therefore depends on the performance and relative health of its sensors and of its actuation system. For instance, when the data from the environment is known with a high degree of certainty, the vehicle can plan a trajectory with a similar sense of certainty about the safety of the vehicle. However, when the performance of either sensors or the actuation system becomes degraded or impaired, the trajectories generated at the vehicle can lead to maneuvering challenges. Accordingly, it is desirable to be able to adjust planning and control of the autonomous vehicle when these systems are degraded to provide for accurate operation of the vehicle.

SUMMARY

In one exemplary embodiment, a method of operating a vehicle is disclosed. A degradation in an operation parameter of the vehicle is measured, the vehicle operating in a first state based on a first value of a set of adaptive parameters. A threat to the vehicle due to operating the vehicle in the first state with the degradation in the operation parameter is determined. The set of adaptive parameters is adjusted from the first value to a second value that mitigates the threat to the vehicle. The vehicle is operated in a second state based on the second value.

In addition to one or more of the features described herein, measuring the degradation in the operation parameter of the vehicle further includes determining a health metric of at least one of a motion system of the vehicle and a sensing system of the vehicle. Adjusting the set of adaptive parameters further includes adjusting at least one of a planning parameter of a planning module and a control parameter of a control module. The method further includes operating the vehicle in the second state when adjusting the set of adaptive parameters from the first value to the second value causes an observability of the degradation to be analyzed. The method further includes simulating the second state by simulating a perturbation to the set of adaptive parameters from the first value to the second value and determining the degradation to be observable by adaptive parameters in at least one of the planning module and the control module. The method further includes taking a preventative action when adjusting the adaptive parameter does not mitigate the threat. The method further includes reducing a cost function to determine the second value of the adaptive parameter.

In another exemplary embodiment, a system for operating a vehicle is disclosed. The system includes a monitoring module and a mitigation module operating on a processor. The monitoring module is configured to measure a degradation in an operation parameter of the vehicle, the vehicle operating in a first state based on a first value of a set of adaptive parameters. The mitigation module is configured to determine a threat to the vehicle due to operating the vehicle in the first state with the degradation in the operation parameter, and adjust the set of adaptive parameters from the first value to a second value that mitigates the threat to the vehicle, wherein the processor operates the vehicle in a second state based on the second value.

In addition to one or more of the features described herein, the monitoring module is further configured to determine a health metric of at least one of a motion system of the vehicle and a sensing system of the vehicle. The adaptive parameter further includes at least one of a planning parameter of a planning module and a control parameter of a control module. The processor operates the vehicle in the second state when adjusting the set of adaptive parameters from the first value to the second value at the mitigation module causes an observability of the degradation to be analyzed. The mitigation module is further configured to simulate the second state by simulating a perturbation to the adaptive parameter from the first value to the second value and determines the degradation to be observable by adaptive parameters of at least one of the planning module and the control module. The mitigation module takes a preventative action when adjusting the adaptive parameter does not mitigate the threat. The mitigation module reduces a cost function to determine the second value of the adaptive parameter.

In yet another exemplary embodiment, a vehicle is disclosed. The vehicle includes a monitoring module and a mitigation module running on a processor. The monitoring module is configured to measure a degradation in an operation parameter of the vehicle, the vehicle operating in a first state based on a first value of a set of adaptive parameters. The mitigation module is configured to determine a threat to the vehicle due to operating the vehicle in the first state with the degradation in the operation parameter, and adjust the set of adaptive parameters from the first value to a second value that mitigates the threat to the vehicle, wherein the processor operates the vehicle in a second state based on the second value.

In addition to one or more of the features described herein, the monitoring module is further configured to determine a health metric of at least one of a motion system of the vehicle and a sensing system of the vehicle. The set of adaptive parameters further includes at least one of a planning parameter of a planning module and a control parameter of a control module. The processor operates the vehicle in the second state when adjusting the set of adaptive parameters from the first value to the second value at the mitigation module causes an observability of the degradation to be analyzed. The mitigation module is further configured to simulate the second state by simulating a perturbation to the set of adaptive parameters from the first value to the second value and determines the degradation to be observable by adaptive parameters of at least one of: the planning module and the control module. The mitigation module takes a preventative action when adjusting the set of adaptive parameters does not mitigate the threat.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
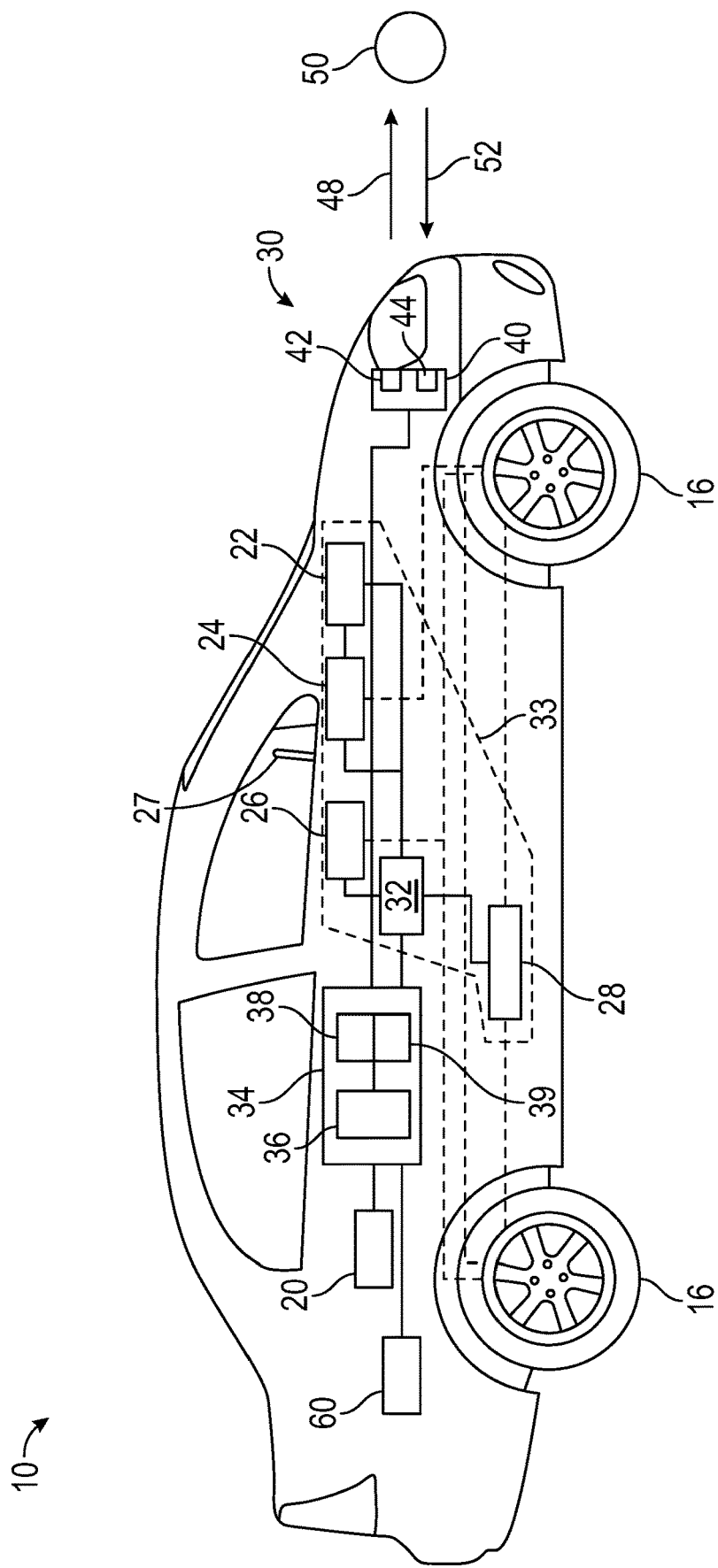
FIG. 1 shows an autonomous vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of Levels One through Five.

The autonomous vehicle 10 generally includes at least a navigation system 20, a propulsion system 22, a transmission system 24, a steering system 26, a brake system 28, a sensing system 30, an actuator system 32, and a controller 34. The propulsion system 22, transmission system 24, steering system 26, brake system 28, and actuator system 32 can be referred to in aggregate as a motion system 33. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensing system 30 includes a radar system 40 that senses objects in an exterior environment of the autonomous vehicle 10 and determines various parameters of the objects useful in locating the position and relative velocities of various remote vehicles in the environment of the autonomous vehicle. Such parameters can be provided to the controller 34. In operation, the transmitter 42 of the radar system 40 sends out a radio frequency (RF) reference signal 48 that is reflected back at the autonomous vehicle 10 by one or more objects 50 in the field of view of the radar system 40 as one or more echo signals 52, which are received at receiver 44. The one or more echo signals 52 can be used to determine various parameters of the one or more objects 50, such as a range of the object, Doppler frequency or relative radial velocity of the object, and azimuth, etc. The sensing system 30 includes additional sensors, such as digital cameras, for identifying road features, Lidar, inertial navigation system, GPS, etc.

A communication system 60 enables communication with a remote device, such as a traffic server, an infrastructure device, a Global Positioning Satellite (GPS) system, etc. and therefore receives data regarding weather conditions, traffic conditions and flow, road construction and repair, etc. The controller 34 builds a trajectory for the autonomous vehicle 10 based on the output of sensing system 30 as well as on information received via the communication system 60. The controller 34 can provide the trajectory to the motion system 33 in order to navigate the autonomous vehicle 10 with respect to the one or more objects 50 and through traffic conditions.

The controller 34 includes a processor 36 and a computer readable storage device or storage medium 38. The storage medium includes programs or instructions 39 that, when executed by the processor 36, operate the autonomous vehicle 10. The storage medium 38 may further include programs or instructions 39 that when executed by the processor 36, enable the processor to plan a trajectory and control vehicle to follow the trajectory. Also, the processor 36 can measure an operational parameter of the vehicle that affects its accurate operation (i.e., an operation parameter of its sensing system 30 or of the motion system 33) and adjusts an adaptive parameter to affect trajectory planning and vehicle control for accurate maneuvering given any constraints imposed by degradation of the operational parameters.

Figure 2:
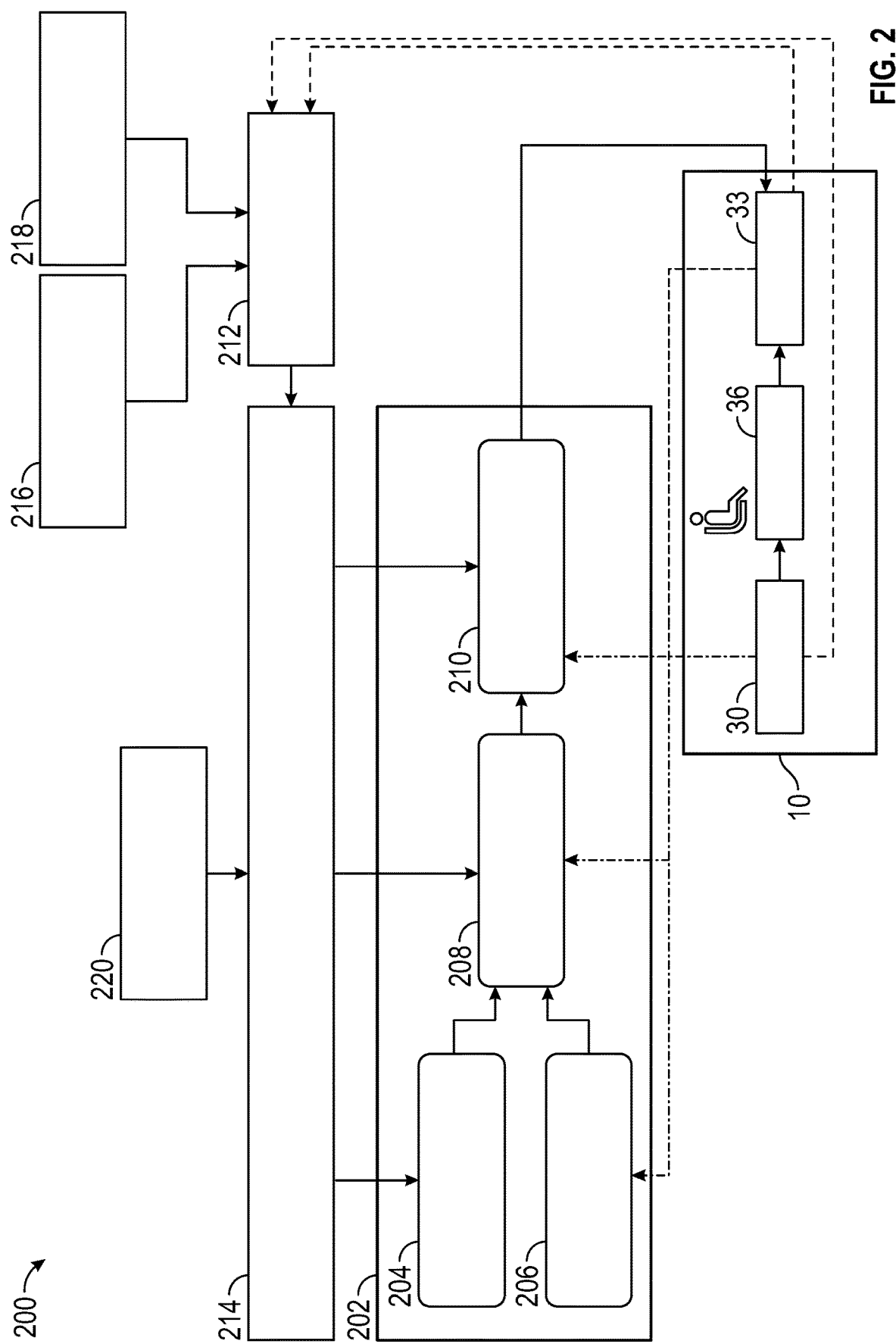
FIG. 2 shows a schematic diagram of a system for adjusting operation of the autonomous vehicle when the autonomous vehicle is experiencing degradations in its various operation parameters.

FIG. 2 shows a schematic diagram of a system 200 for adjusting operation of the autonomous vehicle 10 when the autonomous vehicle is experiencing degradations in its various operation parameters. The autonomous vehicle 10 includes the sensing system 30, processor 36 and motion system 33. The sensing system 30 measures or receives data of the surrounding environment and communicates this data to the processor 36. In various embodiments, the sensing system 30 can further include sensors that monitor the actions or attentiveness of a passenger or driver, such as an eye tracker, etc. The processor 36 makes various calculations to plan a trajectory for the vehicle to control operation of the motion system 33 to move the vehicle along the trajectory.

The processor 36 operates operational modules 202 that control the autonomous operation of the vehicle. The operational modules 202 include a routing module 204, a perception/localization module 206, a planning module 208 and a control module 210. The routing module 204, can be a routing program operating on a processor, such as processor 36. Similarly, the perception/localization module 206 can be a perception/localization program operating on a processor, the planning module 208 can be a planning program operating at a processor, and the control module 210 can be a control program operating at a processor. The modules can be operating at a single processor or each module can be operating at its own dedicated processor, or some modules can be operating at a common processor, while other modules are operating at dedicated processors. The routing module 204 plans a route for the vehicle based on traffic information, input from the passenger, such as a desired destination of the vehicle, etc. The perception/localization module 206 extracts information from the sensed data that gives the autonomous vehicle an awareness of its surroundings, such as a speed limit, traffic light, traffic conditions. The perception/localization module 206 can also use data such as the range, azimuth, elevation of an object, its relative velocity to the vehicle, etc., to determine position and orientation of the autonomous vehicle 10 within its environment. The planning module 208 plans a trajectory of the autonomous vehicle 10 based on the results of the perception/localization module 206. The control module 210 controls the vehicle to move along the trajectory provided from the planning module 208.

The perception/localization module 206, planning module 208 and control module 210 perform their functions using data and feedback from the sensing system 30. Additionally, the planning module 208 and control module perform their functions using data and feedback from the motion system 33.

In an embodiment, each of these operational modules 202 generates output that is parameterized by an adaptive parameter. For example, the planning module 208 can be constrained by an adaptive distance parameter that indicates a maximum distance from which a trajectory can be planned. This maximum distance can be adjusted (e.g., shortened) when the input data does not provide enough data for a safe trajectory over the maximum distance or when the operation of the motion system is impaired to a degree that accurate operation over the maximum distance is uncertain.

The processor 36 also operates a monitoring module 212 and a mitigation module 214. The monitoring module 212 receives data from the motion system 33 and the sensing system 30 and determines a degree of degradation or of uncertainty in their operation. The health of the motion system 33 and/or the sensing system 30 is represented by a measurable operational parameter. Illustrative operational parameters include a range of the radar system 40, a resolution of a digital camera, a friction of tires against the road, an effectiveness of the brake system 28, etc. The monitoring module 212 measures the operational parameter and generates a health metric that represents a degree of degradation in the operational parameter.

The monitoring module 212 also receives information from an infrastructure system 216, which can indicate a road construction, poor road conditions, traffic conditions, etc. The monitoring module 212 also receives environmental data 218 that can affect the operation of the vehicle, such as the presence of snow, wet road conditions, poor light conditions, etc. The health metric can also be based on the information from the infrastructure system 216 and the environmental data 218. The monitoring module 212 can also receive information from passengers of the vehicle 10.

The mitigation module 214 receives the health metrics from the monitoring module 212 as well as all other information required for planning and control such as traffic data and traffic predictions 220 and uses this input to determine the effect of a degradation in an operation parameter on the operation of the vehicle. The mitigation module 214 further determines any adjustments to adaptive parameters of the operational modules 202 that can mitigate the effects of the degradation and changes the adaptive parameters to maintain accurate operation of the vehicle given the degradation.

Figure 3:
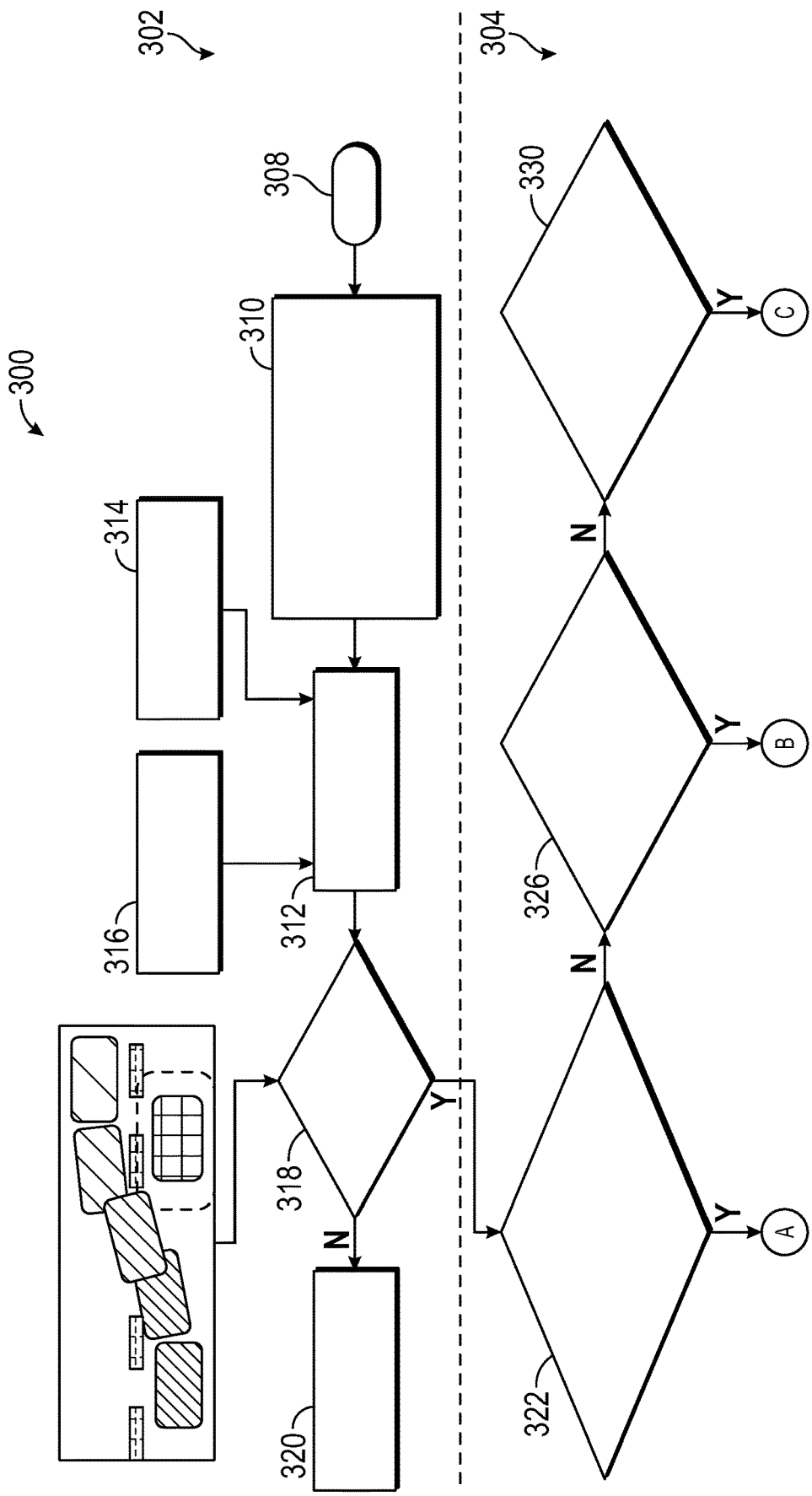
FIG. 3 shows a flowchart illustrating a method performed at a mitigation module of the system of FIG. 2.
Figure 3:
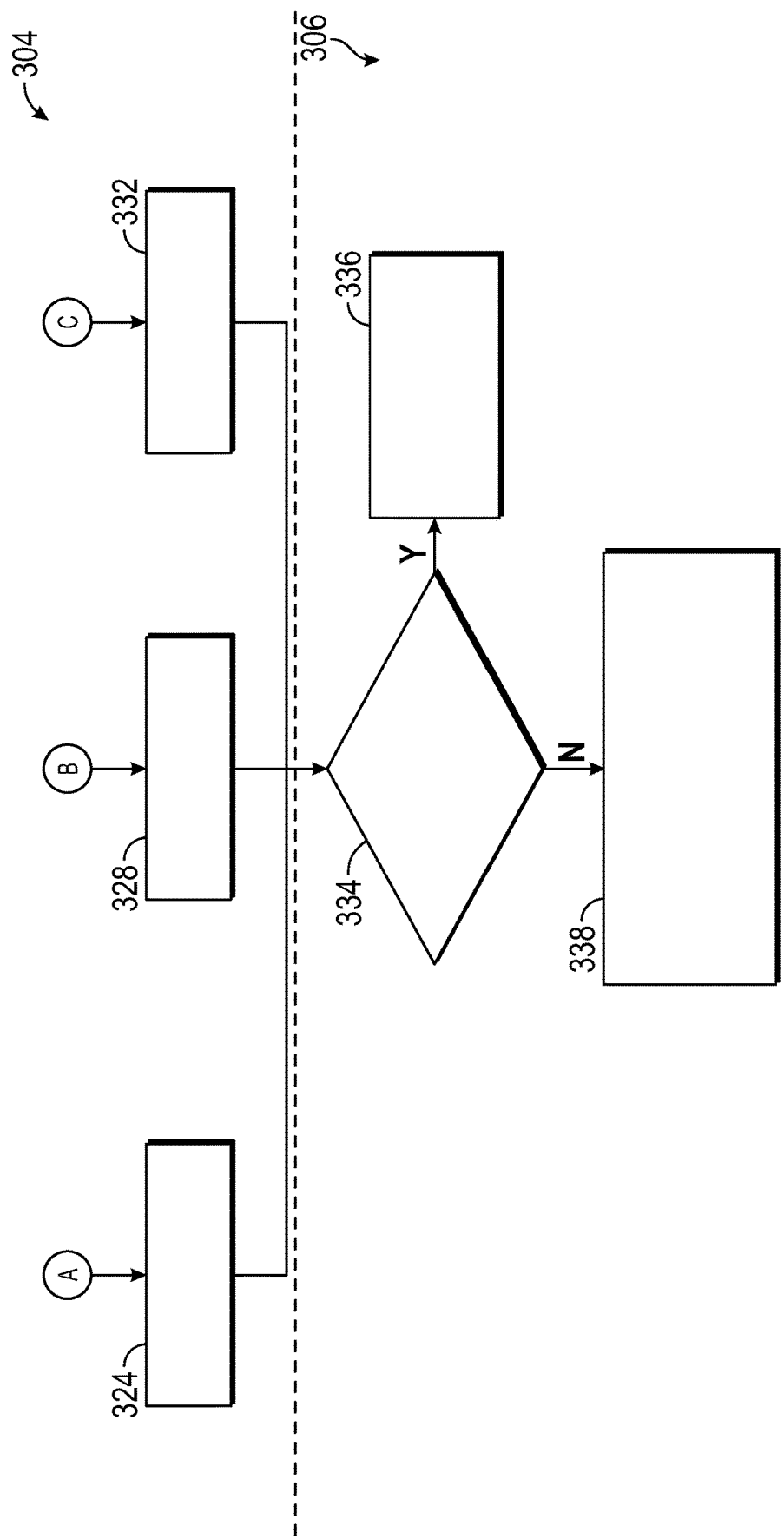

FIG. 3 shows a flowchart 300 illustrating a method performed at the mitigation module 214, in an illustrative embodiment. The mitigation module 214 performs the method across an activation layer 302, an adaptation layer 304 and a communication layer 306. The activation layer 302 determines whether the degradation of various operational parameters affects the operation of the vehicle. The adaptation layer 304 makes an adjustment to one or more adaptive parameters of the operational modules 202 such as the planning module 208 and the control module 210. The communication layer 306 communicates the adjustments to the passenger or driver, depending on the success of the adjustment in mitigating the effects of the degradation in the operation parameter.

The method begins at box 308 in the activation layer 302. At box 310, the health metrics (i.e., uncertainty metrics, driving performance metrics, etc.) are received at the mitigation module 214. In box 312, a threat analysis is performed to determine the extent to which any degradation in the health metrics has on the operation of the vehicle 10. The threat analysis can include the current operational parameters of the planning module 208 and of the control module 210, as shown in box 314, and various perception data and predictions, as shown in box 316 (which are received from the traffic data and traffic predictions 220). In box 318, the processor 36 determines a course of action based on the outcomes of the threat analysis performed in box 312. If no threat is detected, then the method proceeds to box 320 and the vehicle is operated without adjusting the adaptive parameters. If a threat is detected, the method proceeds to box 322 of the adaptation layer 304.

In the adaptation layer 304, the processor 36 determines which adaptive parameter or set of adaptive parameters are to be used to mitigate the effect of the degradation in the operational parameter and makes suitable adjustments. In box 322, the processor simulates a change in the adaptive parameters of both the planning module and control module and determines whether the change makes the degradation observable. If degradation is observed due to adjusting the adaptive parameters of both the planning module and the control module, then the method proceeds to box 324 in which the adjustments are made at the planning module 208 and control module 210. If the degradation is not observed by adjusting the adaptive parameters of both modules, then the method proceeds to box 326.

In box 326, the processor simulates a change to a set of adaptive parameters of the planning module and determines whether the degradation is observable by one or more parameters. If the degradation is observable, the process proceeds to box 328, in which the adjustment to the adaptive parameters is made at the planning module 208.

If the degradation is not observable by the planning module, the method proceeds to box 330. In box 330, the processor 36 simulates a change in a set of adaptive parameters of the control module and determines whether the degradation is observable by the parameter or, in other words, as a result of a change in the parameter. If the degradation is seen by adjusting to the adaptive parameter of the control module, the method proceeds to box 332 in which the adjustment to the adaptive parameter is made at the control module 210.

From any of boxes 324, 328 and 332, the method proceeds to box 334 of the communication layer 306. In box 334, the processor 36 determines whether the fault mitigation (i.e., the adjustments to the adaptive parameter) is successful in mitigating an effect of the degradation. If the threat is successfully mitigated, the method proceeds to box 336 in which the driver or passenger is notified of the degradation to the health metrics and the resulting adjustments are entered into an appropriate one of the operational modules 202. The vehicle then changes from operating in a first state using trajectories and control based on a first value or old value of the adaptive parameter to a second state using trajectories and control based on the second value or new value of the adaptive parameter. If, in box 334, the adjustments are not successful in avoiding the threat, the method proceeds to box 338 in which the vehicle takes more preventative actions, such as disengaging a feature of the vehicle, generating an alarm to the driver or passenger indicating the failure, suggesting an alternate route that includes a repair shop, or any combination thereof.

Figure 4:
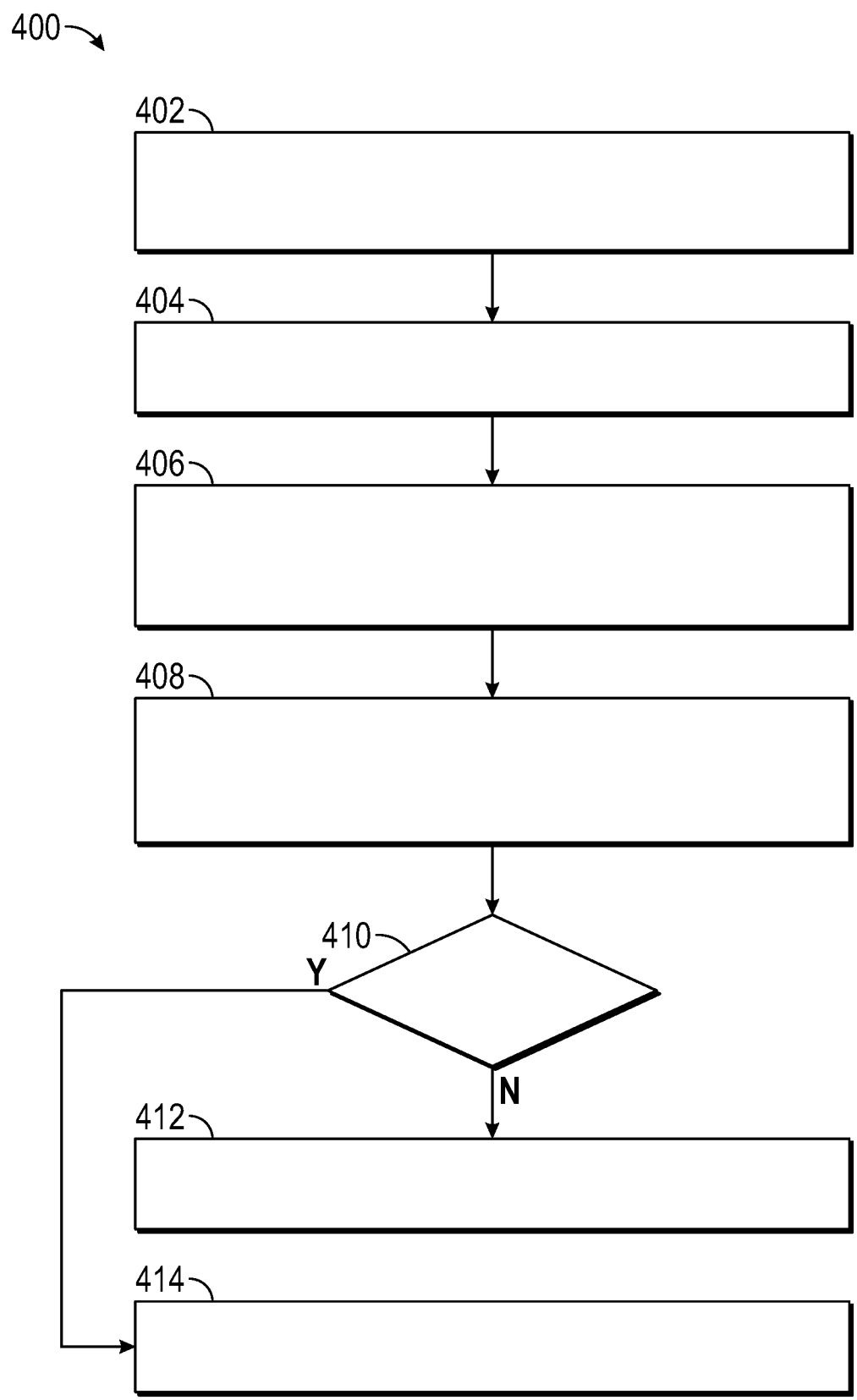
FIG. 4 shows a flowchart illustrating a method of determining whether an uncertainty/degradation is observable by an adaptive parameter.

FIG. 4 shows a flowchart 400 illustrating a method of determining whether an uncertainty/degradation is observable by an adaptive parameter. In box 402, a base utility function $J_{base}$ for operating the vehicle using the adaptive parameters in their current state (i.e., a first value of the adaptive parameter) is determined. The base utility function $J_{base}$ is a linear combination of a utility function based on adaptive parameters of the planning module 208 (i.e., planning parameters $\theta_{PL}$) and a utility function based on the adaptive parameters the control module 210 (i.e., control parameters $\theta_K$), as shown in Eq. (1):

$$J_{base} = \max_{\omega = \Delta M} \alpha_1 J_{cont}(\theta) + \alpha_2 J_{plan}(\theta) \quad \text{Eq. (1)}$$

where $J_{cont}$ is the control utility function and $J_{plan}$ is the planning utility function, where $\theta \in \{\theta_{PL}, \theta_K\}$ is at least one of the planning parameter $\theta_{PL}$ and the control parameter $\theta_K$, and the parameters $\alpha_1$ and $\alpha_2$ can be selected to make the sensitivity analysis of Eq. (1) applicable to either the planning module 208, the control module 210 or a combination thereof. In box 404, a perturbation analysis is performed by perturbing the adaptive parameter $\theta$ as shown in Eq. (2):

$$\theta_d = \theta(1+\beta) \quad \text{Eq. (2)}$$

where $\theta_d$ is the perturbed value of the adaptive parameter and the perturbation parameter $\beta \in \{\beta_{PL}, \beta_K\}$ is at least one of a planning perturbation $\beta_{PL}$ that is applied to the planning parameter $\theta_{PL}$ and a control perturbation $\beta_K$ that is applied to the control parameter $\theta_K$.

In box 406, a perturbation utility function $J_{dist}$ is calculated based on the perturbed value $\theta_d$ of the adaptive parameter, as shown in Eq. (3):

$$J_{dist} = \max_{\Delta M} \alpha_1 J_{cont}(\theta_d) + \alpha_2 J_{plan}(\theta_d) \quad \text{Eq. (3)}$$

It is to be noted that, due to the output of the planning module 208 being used as input at the control module 210, a perturbation of the planning parameter $\theta_{PL}$ affects both the planning utility function $J_{plan}$ and the control utility function $J_{cont}$. A perturbation in the control parameter $\theta_K$ affects only the control utility function $J_{cont}$.

In box 408, a Jacobian matrix is determined from the base utility function and perturbation utility function, as shown in Eq. (4):

$$\Delta J_\theta = \frac{(J_{dist} - J_{base})}{\beta} \quad \text{Eq. (4)}$$

In box 410, the Jacobian is compared to a selected threshold. If the Jacobian is not less than or equal to the threshold, then the method proceeds to box 412 and the degradation is observable by the planning module 208 and control module 210. If the Jacobian is less than or equal to the threshold, then the method proceeds to box 414 and the degradation is not observable by the planning module 208 and control module 210.

The process of adjusting adaptive parameters (i.e., the process of box 324 of FIG. 3) is performed using the optimization equation for a driver comfort to reduce a cost function, as shown in Eq. (5)

$$\min_{\theta_{PL}, \theta_K} \sum_{1}^{N} \left[ (X - X_{ref})^T Q_1 (X - X_{ref}) + X_{jerk}^2 + (\Theta_P - \Theta_{P,ref})^T Q_2 (\Theta_P - \Theta_{P,ref}) + (\Theta_K - \Theta_{K,ref})^T Q_3 (\Theta_K - \Theta_{K,ref}) \right]. \quad \text{Eq. (5)}$$

where X is a current state of the vehicle, $X_{ref}$ is a reference state of the vehicle, $\Theta_{PL}$ is the set of adaptive planning parameters, $\Theta_{PL,ref}$ is a set of reference (original) planning parameters, $\Theta_K$ is the set of adaptive control parameter and $\Theta_{K,ref}$ is a set of reference (original) control parameters. The parameters Q1, Q2 and Q3 are adaptive weight factors that can be adapted based on a detected degradation or fault in the system, and $X_{jerk}$ is a jerk parameter. Eq. (5) is subject to the following constraints:

$$X_{ref} = \mathcal{P}(X, \chi_{obst}, \theta_{PL}) \quad \text{Eq. (6)}$$

$$U = K(X, Y, \theta_K) \quad \text{Eq. (7)}$$

$$Y = h(X, \omega) \quad \text{Eq. (8)}$$

$$\dot{X} = f(X, U, \omega) \quad \text{Eq. (9)}$$

where $\mathcal{P}$ is the planning policy, K is the control policy, Y is a function of the states and the measurements of the vehicle and the uncertainties $\omega$, $\dot{X}$ is a function of system dynamics based on the state X of the vehicle, and $\chi_{obst}$ is a predicted location of the obstacle. A predicted location of the vehicle $\chi_{veh}$ and the predicted location of the obstacle $\chi_{obst}$ are bound by the safety constraint of Eq. (10):

$$\chi_{veh} \cap \chi_{obst} = \emptyset \quad \text{Eq. (10)}$$

which states that their positions do not overlap.

Figure 5:
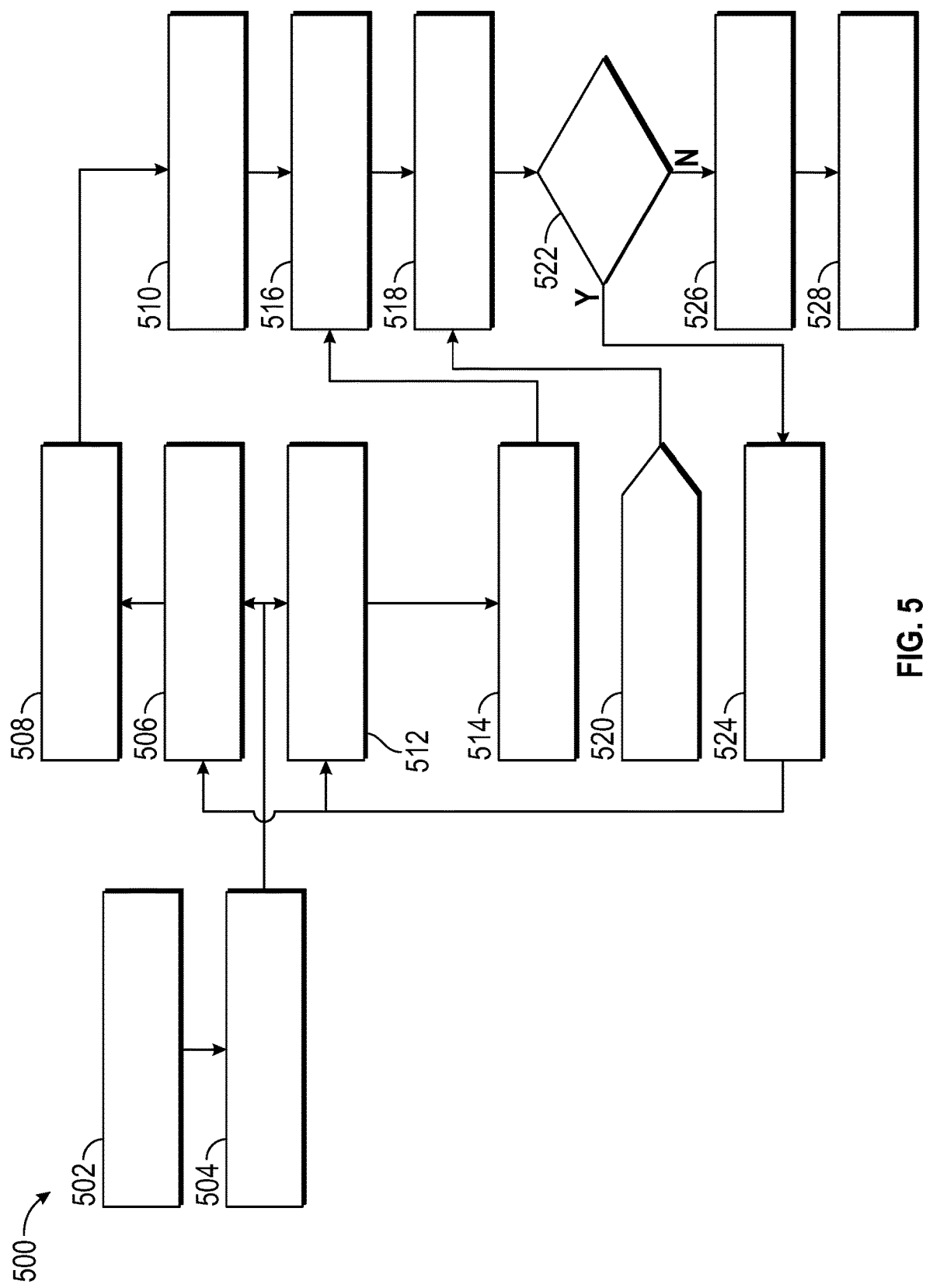
FIG. 5 shows a flowchart of a process for offline and online calculation of adjustments to planning parameters for a planning module of the system of FIG. 2.

FIG. 5 shows a flowchart 500 of a process for offline and online calculation of adjustments to planning parameters for a planning module 208 (i.e., the process of box 328 of FIG. 3). A planning parameter can be either a behavioral parameter or a trajectory parameter. A behavioral parameter adjusts a behavioral planning program operating at the planning module 208, which generates high-level goals for a driving scenario, such as a target speed or a target lane to reach for the vehicle. A trajectory parameter affects a trajectory planning program of the planning module 208, which uses the high-level goals from the behavioral planning program and generates a detailed trajectory for the future motion of vehicle to be used by the control module 210. The process begins at box 502. In box 504, health metrics are obtained. The health metrics are sent to adaptation tables to modify various parameters. The adaptation tables are previously calibrated using the results of offline testing.

In box 506, the health metrics are used at a behavior parameter table to identify adjustments to behavioral parameters. In box 508, the adjustments are made to the behavioral parameters. Behavioral parameters define the set of allowed vehicle maneuvers, or the manner in which the vehicle plans or follows a trajectory, such as permissible lanes, lane speed limits, its maximum acceleration, its maximum heading, etc. In box 510, the adjusted behavioral parameters are used to execute an updated behavioral planning program.

In box 512, the health metrics are used at a trajectory parameter table to identify adjustments to a planning parameter. In box 514, a new trajectory is planned based on the adjusted trajectory planning parameters. In box 516, the new trajectory is executed using the updated behavioral planning program. In box 518, a threat analysis is performed using the new trajectory plan, for example, using the constraint of Eq. (10). Various sensing uncertainties and estimation uncertainties are provided from box 520 when performing the threat analysis of box 518. Box 522 is a decision box based on the threat analysis of box 518. If a threat is detected, the method proceeds to box 524 in which a feedback adaptation policy is implemented. The feedback is sent to the adaptation tables of boxes 506 and 512 in order to obtain a new set of updated behavioral parameters and trajectory planning policy. If, at box 522, no threat is detected, the method proceeds to box 526, in which the updated parameters are used to plan a trajectory. In box 528, the trajectory is sent to the control module for execution.

Figure 6:
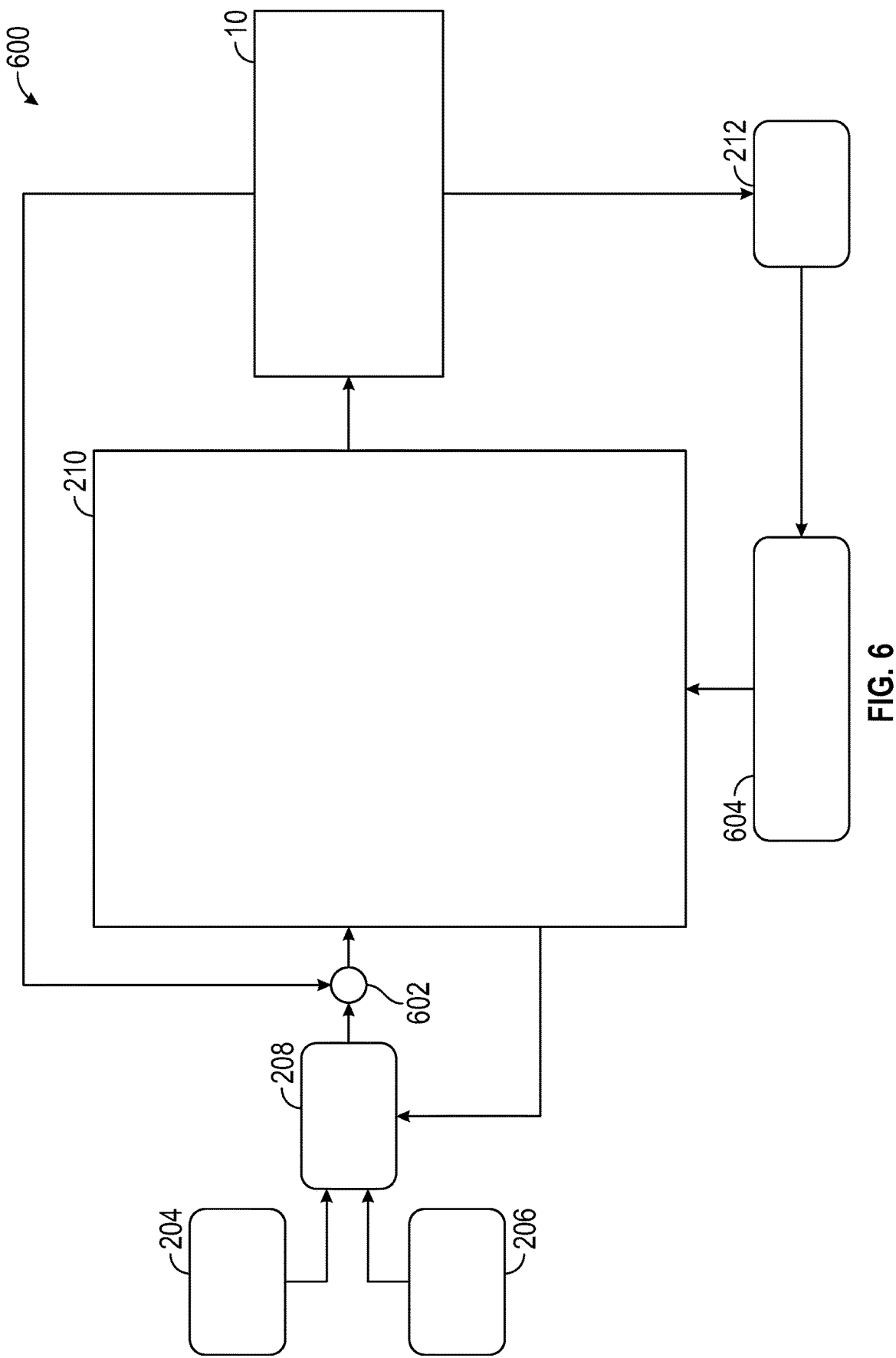
FIG. 6 shows a flowchart of a control module adaptation policy.

FIG. 6 shows a flowchart 600 of a control module adaptation policy. The routing module 204 provides a route plan to the planning module 208 and perception/localization module 206 provides information extracted from sensed data that gives an awareness of the surroundings to the planning module 208. The planning module 208 plans the trajectory of the autonomous vehicle 10 and provides the trajectory to the control module 210. The control module 210 adjusts control parameters based on the trajectory. The process of adjusting control parameters (i.e., the process of box 332 of FIG. 3) includes performing an optimization process to reduce a control cost function involving Eq. (11):

$$\operatorname*{argmin}_{U} \sum_{k=1}^{k=N} (X - X_{ref})_k^T Q (X - X_{ref})_k + (U - U_{ref})^T R (U - U_{ref}) \quad \text{Eq. (11)}$$

subject to the following constraints:

$$X(k+1) = f(X(k), U(k)) \quad \text{Eq. (12)}$$

$$D_{min} \leq x_1 - x_{1,lead} \leq D_{max} \quad \text{Eq. (13)}$$

$$A_{long,min} \leq x_5 \leq A_{long,max} \quad \text{Eq. (14)}$$

$$A_{lat,min} \leq x_6 \leq A_{lat,max} \quad \text{Eq. (15)}$$

with U is the set of control actions such as torque or steering angle:

$$U = [T, U_{steer}] \quad \text{Eq. (16)}$$

and $$X = [x_1, x_2, x_3, x_4, x_5, x_6]^T \quad \text{Eq. (17)}$$

where $x_1$ is longitudinal position, $x_2$ is lateral position, $x_3$ is longitudinal speed, $x_4$ is lateral speed, $x_5$ is longitudinal acceleration and $x_6$ is lateral acceleration. The adjusted control parameters are provided to the vehicle 10. The adjusted control parameters are also provided back to the planning module 208. The planning module 208 is thus informed of the changes in the behavior of the vehicle 10, such as changes in response time, etc. The vehicle 10 provides data feedback to the control module 210. The feedback can be combined with planning trajectory parameters at combiner 602. The dynamic data of the vehicle 10 is also sent to the monitoring module 212 which determines constraints 604 that can be used back at the control module 210 during a subsequent iteration in which the control parameters are adjusted. In one embodiment, controller gains can be adapted based on diagnostic system information. In another embodiment, the controller constraints/references are adapted to ensure an actuation signal that keeps the system in a safe and acceptable zone.

Figure 7:
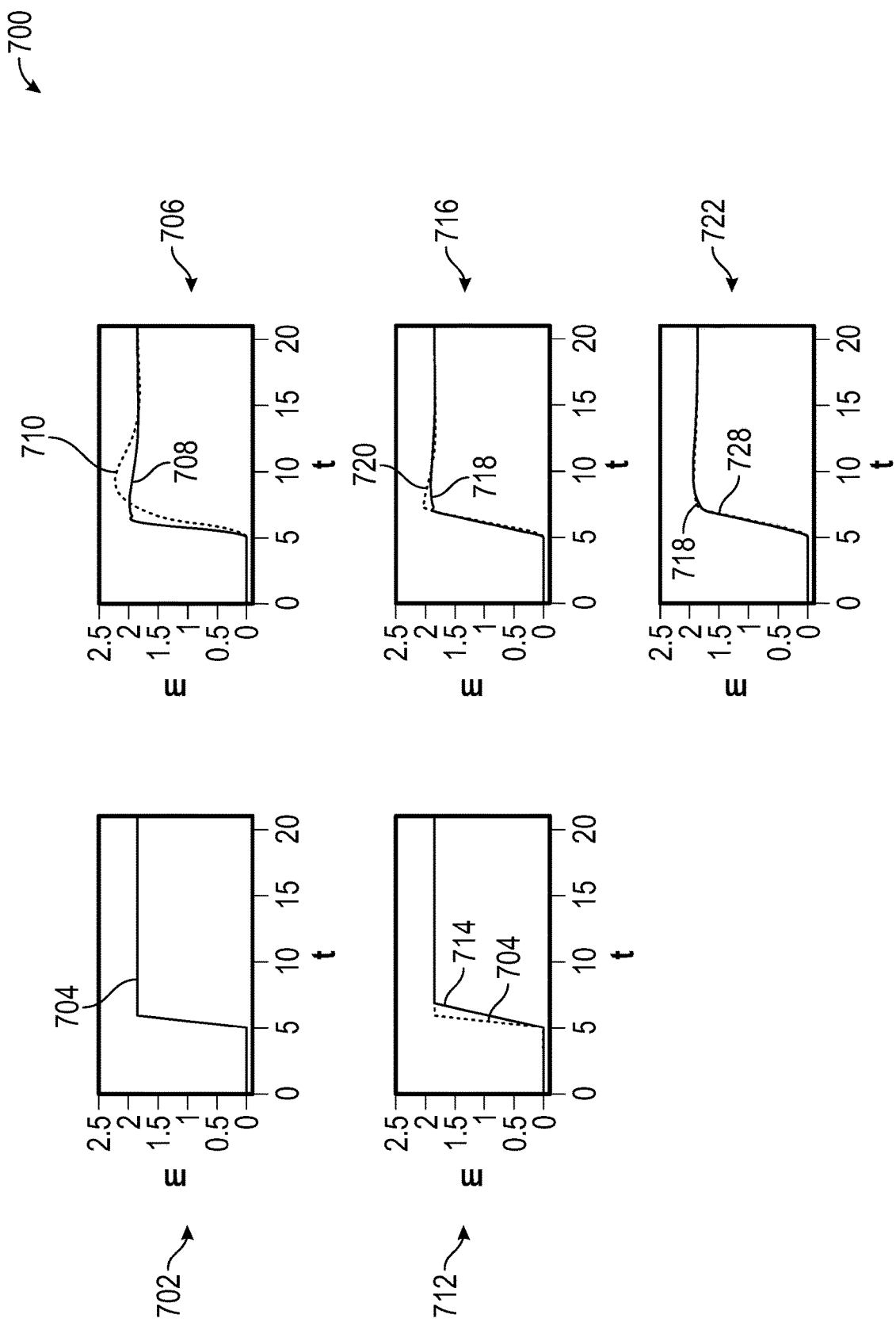
FIG. 7 shows graphs illustrating the effects of adjusting adaptation parameters for the planning module and control module on the resulting trajectory of the vehicle.

FIG. 7 shows graphs 700 illustrating the effects of adjusting adaptation parameters for the planning module 208 and control module 210 on the resulting trajectory of the vehicle. The graphs 700 are an illustration of only one possible operation of the methods disclosed herein and are not meant to be a limitation of the invention. The graphs 700 are discussed with respect to a lateral motion that occurs during a lane change. For each of the graphs, time is shown in seconds along the abscissa and lateral position is shown in meters along the ordinate axis.

Graph 702 shows a planned trajectory 704 that includes a lateral motion of about 2 meters in about 1 second that occurs at t=5 seconds.

Graph 706 shows realized trajectories of the vehicle attempting to replicate the planned trajectory 704 of graph 702. A first realized trajectory 708 occurs when the coefficient of friction between the tires of the vehicle and the road is about 0.83. A second realized trajectory 710 occurs when the coefficient of friction is about 0.33. Both realized trajectories exhibit an overshoot of the targeted lateral position (e.g., 2 meters). Additionally, the second realized trajectory 710 has higher overshoot and requires additional time (at least 5 seconds) to finally arrive at the targeted lateral position. This indicates the vehicle behavior is sensitive to uncertainty in input information (road friction in this example).

Graph 712 shows a replanned trajectory 714 for the lateral motion that is generated using adjusted planning parameters. The planned trajectory 704 is reproduced in graph 712 for comparison. The replanned trajectory 714 allows additional time for the lateral motion (about 2 seconds).

Graph 716 shows realized trajectories of the vehicle attempting to replicate the replanned trajectory 714 of graph 712. A third realized trajectory 718 occurs when the coefficient of friction between the tires of the vehicle and the road is about 0.83. A fourth realized trajectory 720 occurs when the coefficient of friction is about 0.33. The third realized trajectory 718 exhibits little or no lateral overshoot in comparisons to the first realized trajectory 708 of graph 706. Also, the fourth realized trajectory 720 exhibits some overshoot but is able to recover to the targeted lateral position in relatively little time, in comparison to the second realized trajectory 710 of graph 706.

Graph 722 shows realized trajectories when both planning parameters and control parameters are adjusted. Regardless of accuracy in estimation of the coefficient of friction, the realized trajectories 728 are able to conform to the replanned trajectory 714 without any significant overshoot of the targeted lateral position.

Figure 8:
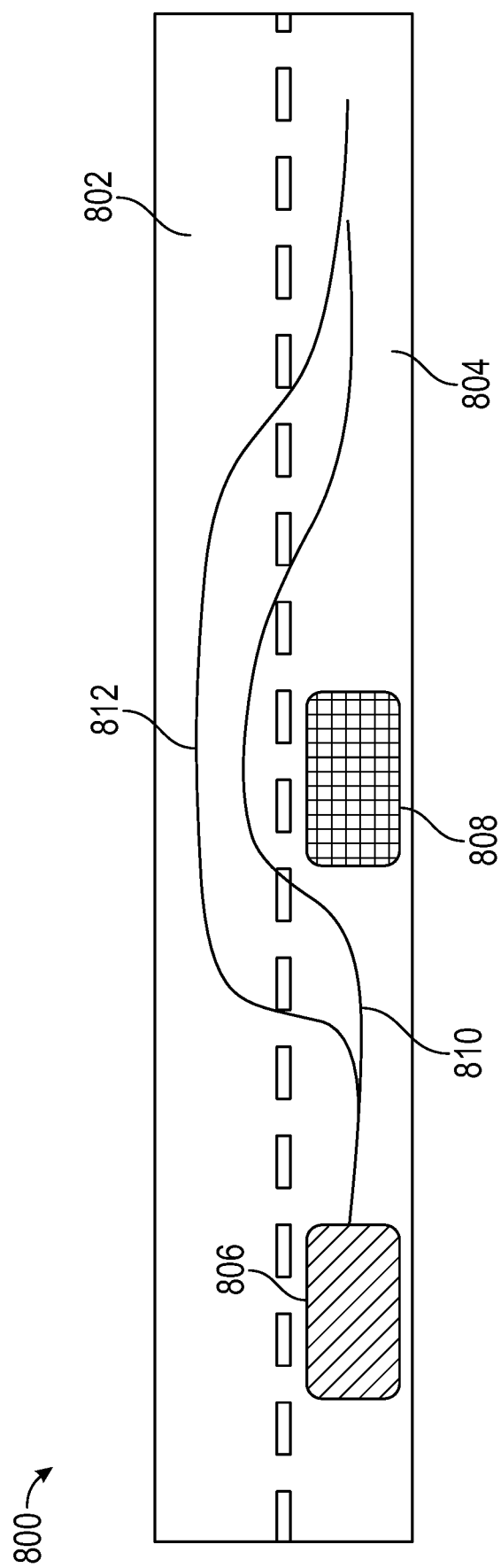
FIG. 8 shows a top view of a road section with a left lane and a right lane or passing lane, in an illustrative embodiment.

FIG. 8 shows a top view of a road section 800 with a left lane 802 or passing lane and a right lane 804, in an illustrative embodiment. A host vehicle 806 and an obstacle vehicle 808 are travelling in the right lane 804 with the host vehicle 806 behind the obstacle vehicle 808 but approaching the obstacle vehicle. The host vehicle 806 plans a trajectory for passing the obstacle vehicle 808 using the left lane 802 with a degradation scenario in which the obstacle vehicle is detected later (i.e. vehicles have a shorter distance) than normal situations. Two trajectories are shown. The first trajectory 810 shows a constant speed maneuver in which the host vehicle 806 passes the obstacle vehicle 808 without changing its speed. The second trajectory 812 shows a variable speed maneuver in which the host vehicle 806 changes its speed to pass the obstacle vehicle 808. In the variable speed maneuver, the host vehicle 806 approaches the obstacle vehicle 808 at a selected speed, slows down to match the planned passing speed and changes lanes at the adapted speed. The host vehicle 806 then accelerates to pass the obstacle vehicle 808 and changes back into the right lane 804 once it has completely passed the obstacle vehicle 808. The second trajectory 812 allows greater clearance between the host vehicle 806 and the obstacle vehicle 808 than does the first trajectory 810. The first trajectory 810 can be performed safely but requires faster lateral accelerations that the adapted planning module has designed during the lane change since there is a shorter gap when the obstacle vehicle detected due to sensing degradation. However, the adaptive parameters of the planning module 208 can be changed to generate the second trajectory 812, in which the maneuver has a variable speed but lower lateral acceleration. Driver preferences can be used to select one of the above trajectories.

Figure 9:
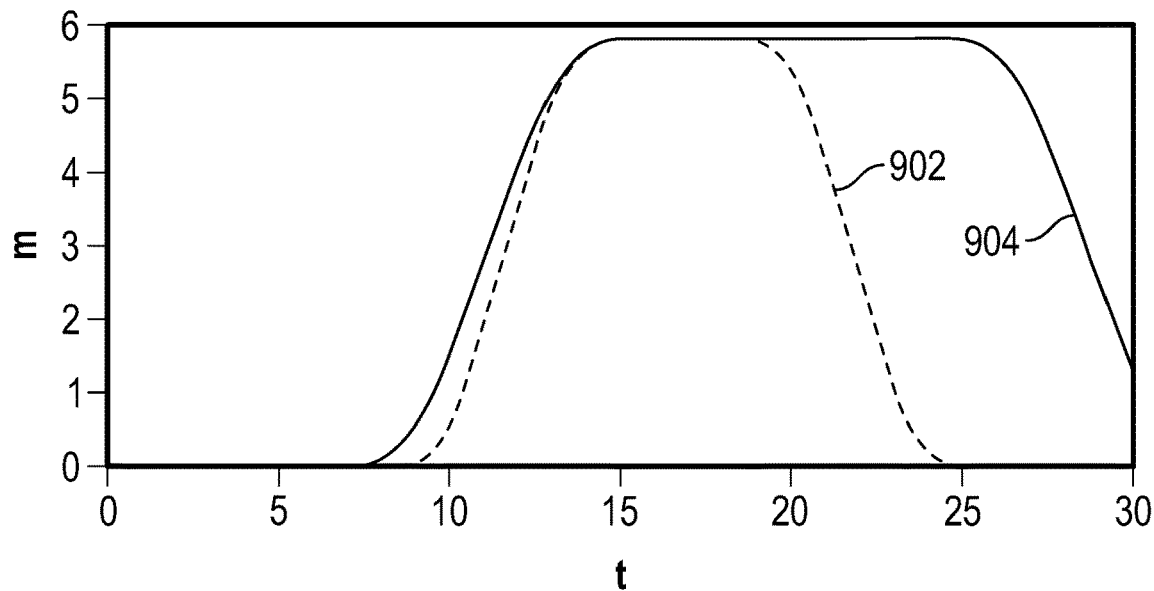
FIG. 9 shows a graph of lateral position over time for a first trajectory and a second trajectory of FIG. 8.

FIG. 9 shows a graph 900 of lateral position over time for the first trajectory 810 and second trajectory 812 of FIG. 8. Time is shown along the abscissa in seconds and lateral position (y) is shown along the ordinate axis in meters. As shown by curve 902, the first trajectory 810 changes from the right lane 804 to the left lane 802 starting at about t=9 seconds, arriving at the left lane 802 at about t=12 seconds. The first trajectory later 810 leaves the left lane 802 at about t=19 seconds, arriving back in the right lane 804 at about t=25 seconds.

As shown by curve 904, the second trajectory 812 changes from the right lane 804 to the left lane 802 starting at about t=8 seconds, arriving at the left lane 802 at about t=12 seconds. The second trajectory 812 later leaves the left lane 802 at about t=25 seconds, arriving back in the right lane 804 after t=30 seconds.

Figure 10:
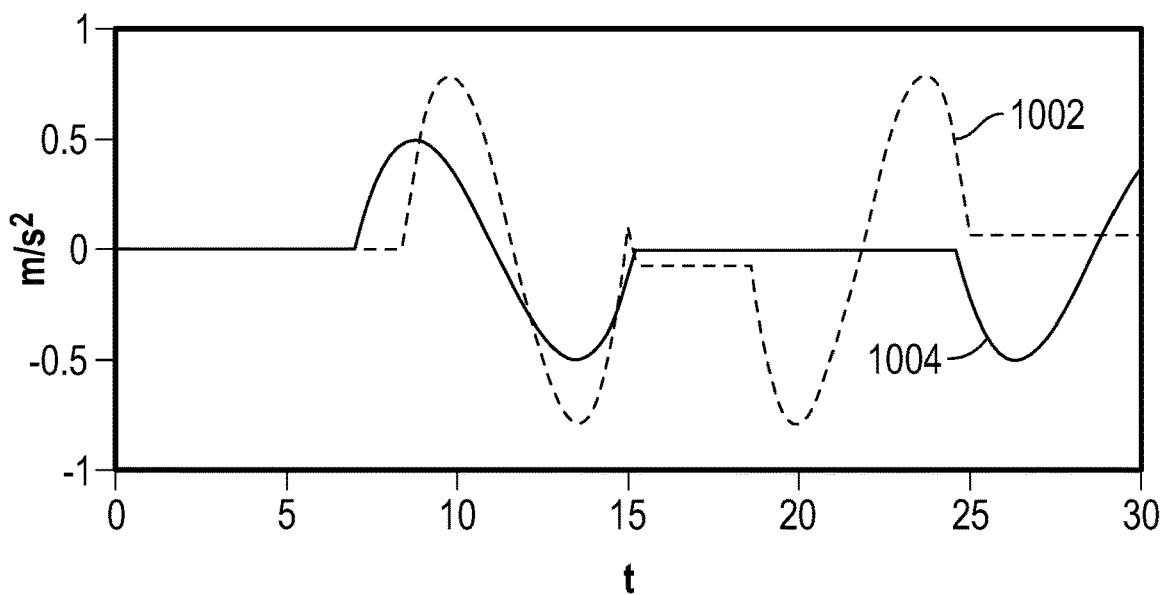
FIG. 10 shows a graph of lateral acceleration values over time for the first trajectory and second trajectory of FIG. 8.

FIG. 10 shows a graph 1000 of lateral acceleration values over time for the first trajectory 810 and second trajectory 812 of FIG. 8. Time is shown along the abscissa in seconds and lateral acceleration ($a_y$) is shown along the ordinate axis in meters/second$^2$. As shown by curve 1002, the lateral acceleration of the first trajectory 810 shows an abrupt change with a large magnitude as the vehicle changes from the right lane 804 to the left lane 802 (e.g., from about t=9 seconds to about t=15 seconds). The lateral acceleration of the first trajectory 810 also shows an abrupt change with a large magnitude as the vehicle changes from the left lane 802 back into the right lane 804 (e.g., from about t=19 seconds to about t=25 seconds).

As shown by curve 1004, the lateral acceleration for second trajectory 812 shows a less abrupt change with a smaller magnitude as the vehicle changes from the right lane 804 to the left lane 802 (e.g. from about t=8 seconds to about t=15 seconds) in comparison to the lateral acceleration for the first trajectory 810 over the same time period. The lateral acceleration for the second trajectory 812 also shows a less abrupt as the vehicle changes from the left lane 802 to the right lane 840 (e.g., from about 19 seconds to about 25 seconds) in comparison to the lateral acceleration for the first trajectory 810 over the same time period. The trajectories of FIG. 8 illustrate that different mitigation strategies can be safe while resulting in different driving performance.

Figure 11:
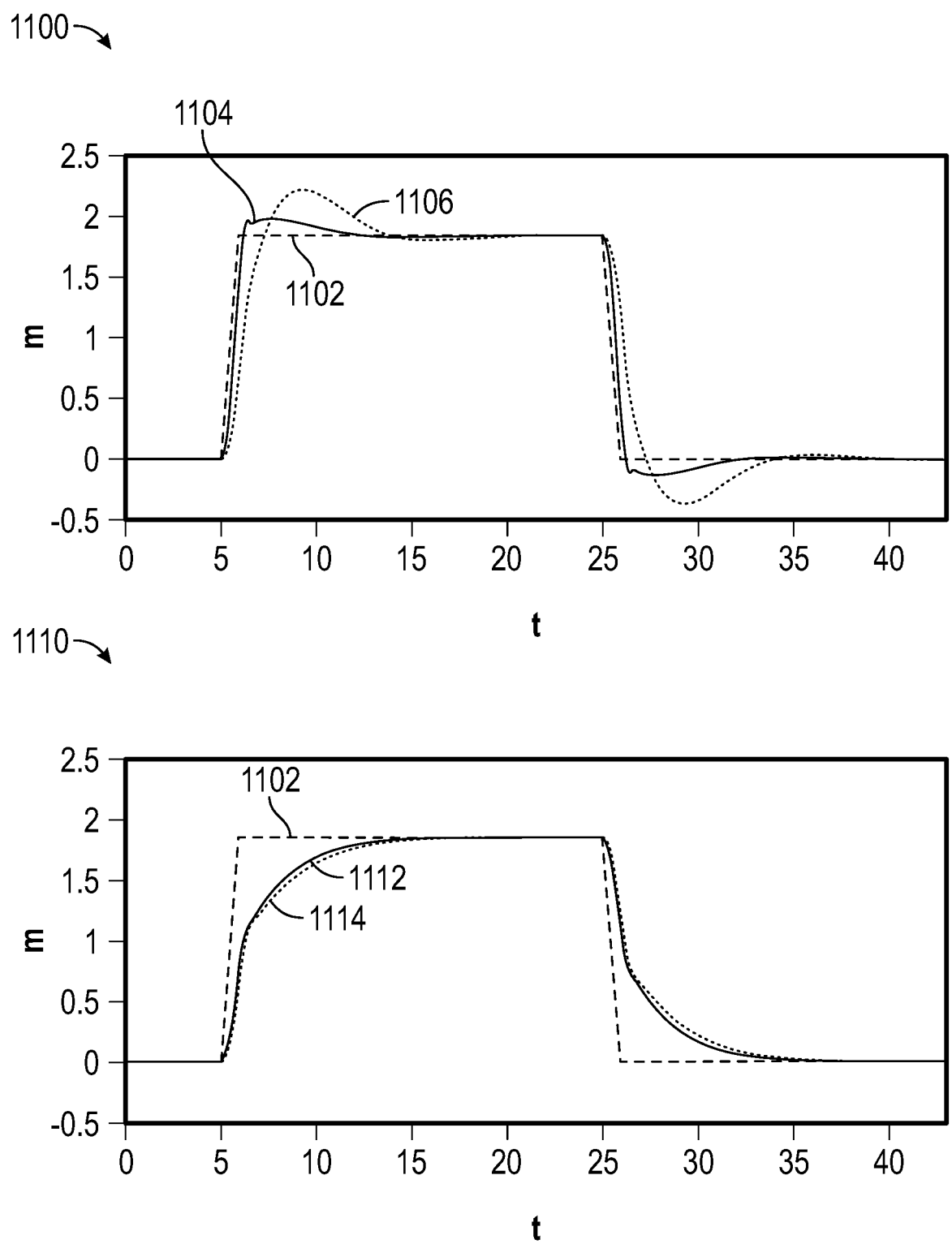
FIG. 11 shows graphs illustrating the effects of adjusting only control parameters.

FIG. 11 shows graphs illustrating the effects of adjusting only control parameters. For each graph, time is shown in seconds along the abscissa and lateral distance is shown in meters along the ordinate axis. Graph 1100 shows planned and realized trajectories with a first value of a control parameter. Planned trajectory 1102 provides a lateral motion of about 1.8 meters at t=5 seconds and a return to its original lateral position at about t=25 seconds. A first realized trajectory 1104 is realized trajectory for a road friction of about 0.83. The first realized trajectory 1104 overshoots the planned trajectory 1102 by about 0.2 meters during the first lateral motion (at t=5 seconds) for about 5 seconds before being able to align with the planned trajectory. Similarly, the first realized trajectory 1104 overshoots the planned trajectory 1102 by about 0.2 meters during the second lateral motion (at t=25 seconds), eventually aligning with the planned trajectory after about 5 seconds.

A second realized trajectory 1106 shows a realized trajectory for a road friction of about 0.33. The second realized trajectory 1106 overshoots the planned trajectory 1102 by about 0.4 meters during the first lateral motion for about 10 seconds before being able to align with the planned trajectory. Similarly, the second realized trajectory 1106 overshoots the planned trajectory 1102 by about 0.4 meters during the second lateral motion, eventually aligning with the planned trajectory after about 10 seconds.

Graph 1110 shows planned and realized trajectories with a second value of a control parameter, adjusted to account for degradation in operation parameters of the motion system 33. The planned trajectory 1102 from graph 1100 is shown for reference. Third realized trajectory 1112 is a realized trajectory for a road friction of about 0.83. The third realized trajectory 1112 gradually approaches the planned trajectory 1102 over about a 10 second time interval during the first lateral motion and similarly approaches the planned trajectory over about a 10 second interval during the second lateral motion. Fourth realized trajectory 1114 is a realized trajectory for a road friction of about 0.33. The fourth realized trajectory 1114 follows or substantially follows the same trajectory as the third realized trajectory 1112

With the second value of the control parameter, the lateral movement of the third realized trajectory 1112 and fourth realized trajectory 1114 is slower than the lateral movement of the first realized trajectory 1104 and second realized trajectory 1106. However, the third realized trajectory 1112 and fourth realized trajectory 1104 the same or substantially the same, independent of the road conditions (i.e., independent of the accuracy of the estimated road friction). The effects of the uncertainty of road conditions is therefore mitigated by adapting the control parameters to avoid unsafe driving.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of operating a vehicle, comprising:
measuring a degradation in an operation parameter of the vehicle, the vehicle operating in a first state based on a first value of an adaptive parameter;
determining a threat to the vehicle due to operating the vehicle in the first state with the degradation in the operation parameter;
adjusting the adaptive parameter from the first value to a second value that mitigates the threat to the vehicle;
simulating a second state by simulating a perturbation to the adaptive parameter from the first value to the second value;
identifying the degradation in a planning module or a control module of the vehicle; and
operating the vehicle in the second state based on the second value.

2. The method of claim 1, wherein measuring the degradation in the operation parameter of the vehicle further comprises determining a health metric of at least one of: (i) a motion system of the vehicle; and (ii) a sensing system of the vehicle.

3. The method of claim 1, wherein adjusting the adaptive parameter further comprises adjusting at least one of: (i) a planning parameter of the planning module; and (i) a control parameter of the control module.

4. The method of claim 3, further comprising operating the vehicle in the second state when adjusting the adaptive parameter from the first value to the second value causes an observability of the degradation to be analyzed.

5. The method of claim 1, further comprising taking a preventative action when adjusting the adaptive parameter does not mitigate the threat.

6. The method of claim 1, further comprising reducing a cost function to determine the second value of the adaptive parameter.

7. A system for operating a vehicle, comprising:
a monitoring module running on a processor, the monitoring module configured to measure a degradation in an operation parameter of the vehicle, the vehicle operating in a first state based on a first value of an adaptive parameter; and
a mitigation module running on the processor, the mitigation module configured to:
determine a threat to the vehicle due to operating the vehicle in the first state with the degradation in the operation parameter;
adjust the adaptive parameter from the first value to a second value that mitigates the threat to the vehicle;
simulate a second state by simulating a perturbation to the adaptive parameter from the first value to the second value; and
identify the degradation in a planning module or a control module of the vehicle;
wherein the processor operates the vehicle in the second state based on the second value.

8. The system of claim 7, wherein the monitoring module is further configured to determine a health metric of at least one of: (i) a motion system of the vehicle; and (ii) a sensing system of the vehicle.

9. The system of claim 7, wherein the adaptive parameter further comprises at least one of: (i) a planning parameter of the planning module; and (ii) a control parameter of the control module.

10. The system of claim 9, wherein the processor operates the vehicle in the second state when adjusting the adaptive parameter from the first value to the second value at the mitigation module causes an observability of the degradation to be analyzed.

11. The system of claim 7, wherein the mitigation module takes a preventative action when adjusting the adaptive parameter does not mitigate the threat.

12. The system of claim 7, wherein the mitigation module reduces a cost function to determine the second value of the adaptive parameter.

13. A vehicle, comprising:
a monitoring module running on a processor, the monitoring module configured to measure a degradation in an operation parameter of the vehicle, the vehicle operating in a first state based on a first value of an adaptive parameter; and
a mitigation module running on the processor, the mitigation module configured to:
determine a threat to the vehicle due to operating the vehicle in the first state with the degradation in the operation parameter;
adjust the adaptive parameter from the first value to a second value that mitigates the threat to the vehicle;
simulate a second state by simulating a perturbation to the adaptive parameter from the first value to the second value; and
identify the degradation in a planning module or a control module of the vehicle;
wherein the processor operates the vehicle in the second state based on the second value.

14. The vehicle of claim 13, wherein the monitoring module is further configured to determine a health metric of at least one of: (i) a motion system of the vehicle; and (ii) a sensing system of the vehicle.

15. The vehicle of claim 13, wherein the adaptive parameter further comprises at least one of: (i) a planning parameter of the planning module; and (ii) a control parameter of the control module.

16. The vehicle of claim 15, the processor operates the vehicle in the second state when adjusting the adaptive parameter from the first value to the second value at the mitigation module causes an observability of the degradation to be analyzed.

17. The vehicle of claim 13, wherein the mitigation module takes a preventative action when adjusting the adaptive parameter does not mitigate the threat.

* * * * *